Aug. 21, 1945.     W. A. MULHERN     2,383,071
TRIM RING
Filed Sept. 18, 1942
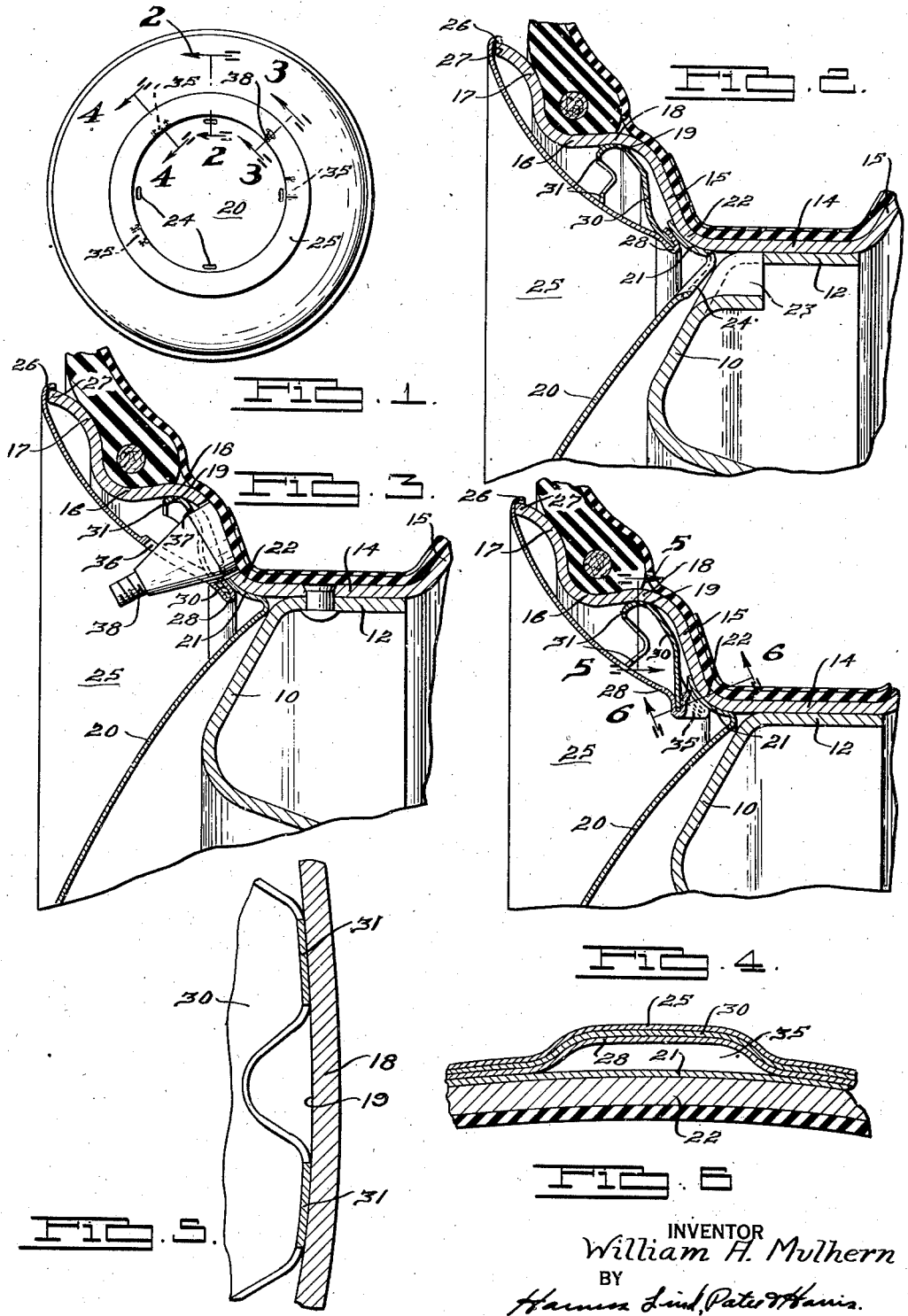
INVENTOR
William H. Mulhern
BY
ATTORNEYS Patented Aug. 21, 1945

2,383,071

UNITED STATES PATENT OFFICE 2,383,071

TRIM RING

William A. Mulhern, Detroit, Mich., assignor to Chrysler Corporation, Highland Park, Mich., a corporation of Delaware Application September 18, 1942, Serial No. 458,818

4 Claims. (Cl. 41—10)

My present invention relates to vehicle wheels.

The principal object of the present invention is to provide means whereby a smoothly finished exterior is provided for a wheel of the safety rim type comprising a drop center tire well, offset tire bead receiving portions and safety ridges struck upwardly at the inner edges of the offset tire bead receiving portions and forming slightly reentrant depressions at the inner edges of the outer surfaces of the bottom walls of the tire bead receiving offsets. An object of the present invention is to provide a trim piece for such a vehicle wheel which might be so finished as to present the appearance of a white side wall tire extending from a smoothly contoured hub of relatively small diameter.

A further object of the present invention is to provide a trim piece in an assembly of the foregoing type which will provide means for fastening an ornamental hub cover over the disc of the wheel.

A further object of the present invention is to provide a trim piece for the rim of a vehicle wheel of the foregoing type which may be conveniently associated with and disassociated from a wheel, and which may be readily manufactured with but few simple operations.

The objects and advantages of the present invention will be more readily understood from an inspection of the following specification taken in connection with the accompanying drawing wherein like numerals refer to like parts throughout.

In the drawing,

Fig. 1 is a side elevation of the outer surface of a wheel assembly having a tire and the present invention applied thereto;

Fig. 2 is a partial section on an enlarged scale taken along line 2—2 of Fig. 1;

Fig. 3 is a similar partial section taken along line 3—3 of Fig. 1;

Fig. 4 is a similar view taken along line 4—4 of Fig. 1;

Fig. 5 is a partial section on a greatly enlarged scale taken along line 5—5 of Fig. 4; and Fig. 6 is a further partial section taken along line 6—6 of Fig. 4.

The present invention is adapted to be applied to a wheel including a demountable disc portion 10 by means of which the disc may be removably attached to a hub of the driving mechanism. The peripheral flange 12 of the disc wheel is attached to the bottom wall 14 of a rim including a drop center tire well formed by the bottom wall 14 and side walls 15, and offset tire bead receiving portions including bottom walls 16 and outwardly flared flanges 17. A slight safety ridge 18 is provided at each of the angles formed by the walls 15 and 16 by forcing the metal of the rim upward, the displacement of the metal forming slightly reentrant depressions 19 on the outer surface of the rim. When the usual tire and tube is assembled in the rim as shown, the safety ridges prevent accidental displacement of the tire beads so that serious accidents after blowouts are often prevented from happening.

In accordance with usual practice the assembly is provided with an ornamental, inwardly dished hub cover 20 which is provided for the purpose of presenting a smooth outward contour.

In accordance with my invention the outer edge portion 21 of the hub cover 20 is flanged outwardly and shaped to conform to the contour of the shoulder 22 between the bottom wall 14 and the side wall 15, so that the shoulder 22 serves to center the hub cover with respect to the wheel. The disc wheel 10 may be provided with the usual chain grip openings 23, and the hub cover 20 is preferably provided with a plurality of matching chain grip openings 24 so that a chain may be applied without removing the hub cover.

In order to continue the pleasing visual effect of smooth contours the assembly is provided with an outwardly flared rim covering collar 25 which may be painted to match the body trim or to present the appearance of a white side wall tire of great depth attached to a hub of relatively small diameter. The outer edge of the collar 25 is flanged inwardly at 26 so as to hook over the edge 27 of the rim. The inner edge of the collar 25 is bent over to provide a bead 28 of such diameter as to overlie part of the flange 21 of the hub cover 20. The inner edge of a locking ring 30 is clamped in the angle formed at the bead 28, the locking ring extending outwardly from the inner edge of the collar 25 to contact the bottom wall 16 of the offset portion of the rim when the collar is applied to the rim. The free edge of the locking ring 30 is preferably serrated to provide a plurality of individual tongues 31 having some degree of movement with respect to each other; and the free edge of the locking ring is rounded outwardly and downwardly to present a rounded surface adapted to be engaged in the depression 19. The distance between the inner edge of the collar 25 and the rounded edges of the tongues 31 is such as to cause considerable force to be exerted inwardly against the bead 28 when the collar 25 is forced onto the rim. The material of the locking ring 30 is preferably relatively rigid and that of the collar 25 relatively limber so that the material of the collar may spring between its edges when such a force is exerted by engagement of the locking ring and the rim. This springing of the material of the collar permits the tongues 31 to engage in the depression 19 whereupon the hooked part 26 of the collar will firmly engage over the edge 27 of the rim and the bead 28 of the collar will be firmly thrust against the flange 21 of the hub cover 20. The collar 25 thus not only serves to provide an ornamental appearance for the outer surface of the rim but also functions to lock the hub cover 20 in position.

The bead 28 of the collar 25 is preferably displaced outwardly for a short distance at one or more points such as indicated at 35 so as to provide at least one, and preferably more, openings through which a tool may be inserted between the inner surface of the locking ring 30 and the outer surface of the side wall 15 of the rim, in order that the locking ring may be forced from engagement with the depression 19 for removal of the collar and hub cover.

As shown in Fig. 3 the collar 25 is provided with an opening 36, and the locking ring 30 is provided with a matching opening 37, through which the valve stem 38 may extend.

It can be readily seen that rapid assembly of the parts of the wheel may be afforded merely by placing the hub cover and collar in position and pressing inwardly on the collar 25. Rapid removal of these parts may be afforded by inserting tools through the openings 35 and forcing the collar outward.

Having illustrated and described the preferred embodiments of my present invention, it should be apparent to those skilled in the art that the same permits of various modifications in arrangement and detail. All such as come within the scope of the following claims are considered a part of my invention.

I claim:

1. A collar adapted to be detachably mounted on a wheel assembly including a rim having a circumferentially extending ridge provided with convexed inner and concaved outer sides, said collar including an outer edge portion adapted to engage said rim, an inner edge portion adapted to abut said assembly and an intermediate shrouding part, and a locking ring engaged with said collar at said inner edge thereof and including a curved portion adapted to engage the concaved side of said ridge and operable when compressed thereagainst to thrust the inner edge of said collar against the assembly, and a plurality of bowed projections extending from said curved portion toward said intermediate part and adapted to engage therewith for yieldably opposing deflection of the locking ring during mounting of the collar.

2. A collar adapted to be detachably mounted on a wheel assembly including a rim having a circumferentially extending ridge provided with convexed inner and concaved outer sides, said collar including an outer edge portion adapted to engage said rim, an inner edge portion adapted to abut said assembly and an intermediate shrouding part, and a locking ring engaged with said collar at said inner edge thereof and including a curved portion adapted to engage the concaved side of said ridge and operable when compressed thereagainst to thrust the inner edge of said collar against the assembly, and a plurality of projections extending from said curved portion toward said intermediate part and adapted to engage therewith for yieldably opposing deflection of the locking ring during mounting of the collar.

3. A collar adapted to be detachably mounted on a wheel assembly including a rim having a circumferentially extending ridge provided with convexed inner and concaved outer sides and a hub cover having a part thereof abutting said collar having an outer edge portion thereof adapted to hook over the outer edge of said rim and an inner edge adapted to abut said cover part, and a locking ring engaged with said collar at the inner edge thereof and including a plurality of relatively movable tongues each having a curved portion adapted to engage the concaved side of said hump and operable when compressed thereagainst to thrust the inner edge of said collar against said hub cover, at least some of said tongues including a bowed projection having an end portion adapted to engage said collar intermediate the said edges thereof for yieldably opposing deflection of the locking ring during mounting of the collar.

4. A collar adapted to be detachably mounted on a wheel assembly including a rim having a circumferentially extending ridge provided with convexed inner and concaved outer sides, said collar including an outer edge portion adapted to engage said rim, an inner edge portion adapted to abut said assembly and an intermediate shrouding part, and a locking ring engaged with said collar at said inner edge thereof and including a curved portion adapted to engage the concaved side of said ridge and operable when compressed thereagainst to thrust the inner edge of said collar against the assembly, and a plurality of bowed projections extending from said curved portion toward said intermediate part and adapted to engage therewith for yieldably opposing deflection of the locking ring during mounting of the collar, a portion of said collar inner edge being so formed as to provide an opening between the rim and collar when the latter is mounted for insertion therein of a tool to forcibly withdraw the locking ring from said concaved side.

WILLIAM A. MULHERN.